US012782851B2

(12) United States Patent
Pettingill et al.

(10) Patent No.: US 12,782,851 B2
(45) Date of Patent: Nov. 3, 2026

(54) ELONGATED CORDS FOR CLEANING DEVELOPER DEVICE NIPS

(71) Applicant: Hewlett-Packard Development Company, L.P., Spring, TX (US)

(72) Inventors: Justin D. Pettingill, Boise, ID (US); Kyler Riley Ayers, Boise, ID (US); Miguel Angel de Anda Lopez, Boise, ID (US); Katelyn Christine Morse, Boise, ID (US); David M. Payne, Boise, ID (US); Jeffrey Harold Luke, Boise, ID (US); Paul L. Jeran, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 19/119,750

(22) PCT Filed: Oct. 19, 2022

(86) PCT No.: PCT/US2022/078348

§ 371 (c)(1),
(2) Date: Apr. 9, 2025

(87) PCT Pub. No.: WO2024/085900

PCT Pub. Date: Apr. 25, 2024

(65) Prior Publication Data

US 2026/0140462 A1 May 21, 2026

(51) Int. Cl.
*G03G 21/16* (2006.01)
*G03G 15/08* (2006.01)
*G03G 15/095* (2006.01)
*G03G 21/18* (2006.01)

(52) U.S. Cl.
CPC ....... *G03G 15/095* (2013.01); *G03G 15/0808* (2013.01); *G03G 15/0812* (2013.01); *G03G 15/0898* (2013.01); *G03G 21/1814* (2013.01); *G03G 21/1828* (2013.01)

(58) Field of Classification Search
CPC ........... G03G 15/0808; G03G 15/0898; G03G 15/095; G03G 15/0812; G03G 21/1814; G03G 21/1828
See application file for complete search history.

(56) References Cited

U.S. PATENT DOCUMENTS

2015/0098734 A1 4/2015 Uchida et al.

FOREIGN PATENT DOCUMENTS

| | | | | |
|---|---|---|---|---|
| JP | 07-168440 | A | | 7/1995 |
| JP | 07-333982 | A | | 12/1995 |
| JP | 2004-020877 | A | | 1/2004 |
| JP | 2008-275784 | A | | 11/2008 |
| JP | 2009-282461 | A | | 12/2009 |
| JP | 2015087736 | A | * | 5/2015 |

* cited by examiner

*Primary Examiner* — Hoang X Ngo
(74) *Attorney, Agent, or Firm* — Foley & Lardner LLP

(57) ABSTRACT

In some examples, a developer device for an image forming device includes a developing roller and a regulator. A nip is between the regulator and the developing roller, where a developing agent is to pass through the nip. The developer device includes an elongated cord to traverse a length of the nip in response to an applied tension.

15 Claims, 6 Drawing Sheets

ELONGATED CORDS FOR CLEANING DEVELOPER DEVICE NIPS

CROSS-REFERENCE TO RELATED APPLICATIONS

This application is a U.S. National Stage Application under 35 U.S.C. § 371 of PCT/US2022/078348, filed Oct. 19, 2022, which is hereby incorporated by reference in its entirety.

BACKGROUND

A printing device can deliver a print material to a print medium to form an image on the print medium. In some examples, a printing device can be an electrophotographic printing device that supplies a toner (which is a type of print material) to an electrostatic latent image formed on a photoreceptor to form a visible toner image on the photoreceptor. The electrophotographic printing device transfers the toner image to a print medium, and then fixes the transferred toner image to the print medium, to form an image on the print medium.

BRIEF DESCRIPTION OF THE DRAWINGS

Some implementations of the present disclosure are described with respect to the following figures.

Figure 1:
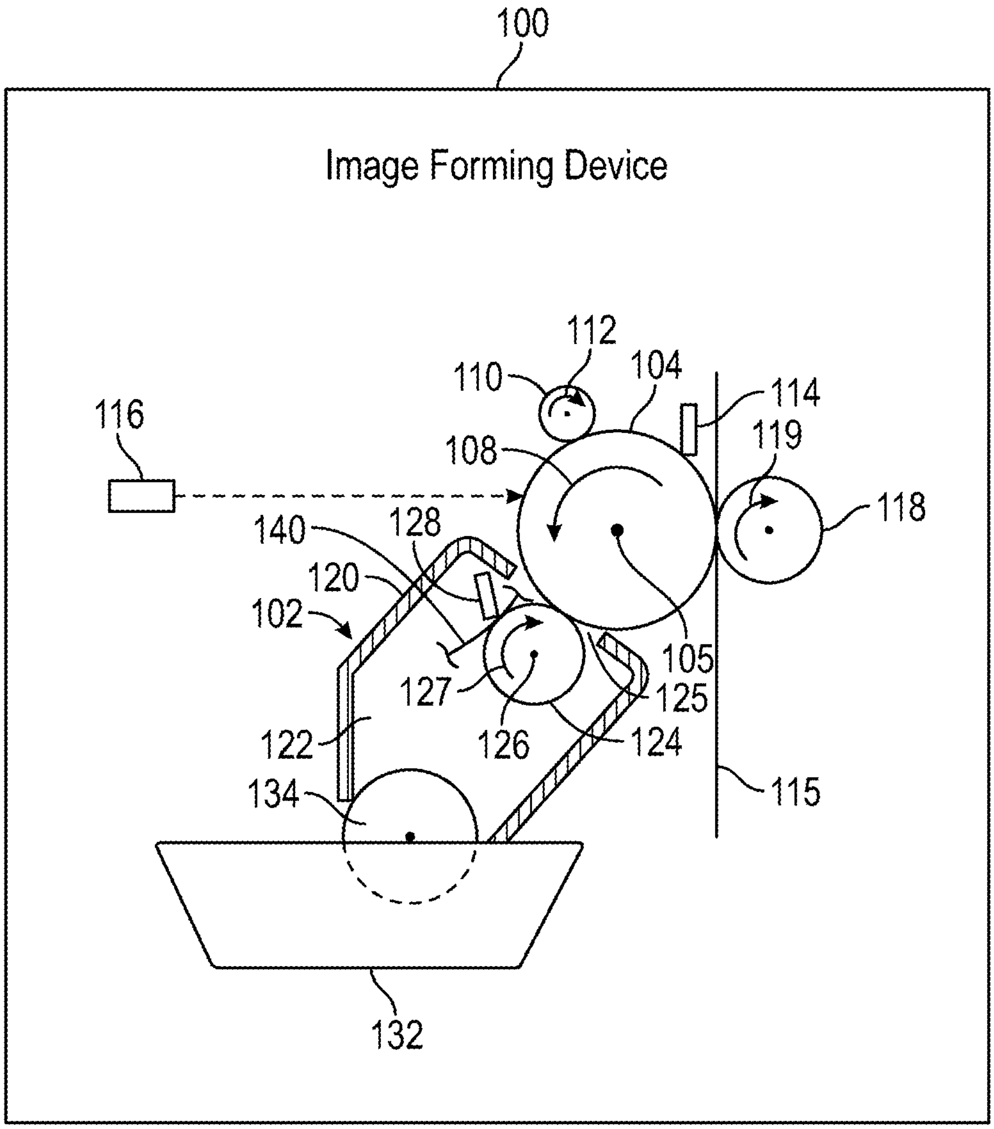
FIG. 1 is a sectional schematic diagram of an image forming device according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An image forming device such as an electrophotographic printing device can employ a photoreceptor on which an electrostatic latent image is formed, for use in transferring an image to a target medium (e.g., a print medium such as a paper substrate or a substrate of another material). The photoreceptor can be in the form of a photosensitive drum that includes a cylindrical tubular structure and a photosensitive layer on the cylindrical tubular structure.

A charging element can be used to charge a surface of the photosensitive drum to a uniform electrical potential (e.g., a negative electrical potential). In some examples, the charging element can include a charging roller. In other examples, a charging element can be in the form of a corona charger that can charge the surface of the photosensitive drum to a uniform electrical potential without making physical contact with the surface of the photosensitive drum.

A light source (e.g., a laser source, light emitting diode(s) (LEDs), etc.) can be activated by a controller of the image forming device to irradiate selected portions of the charged surface of the photosensitive drum, to form an electrostatic latent image on the photosensitive drum.

A developer device in the image forming device includes a developer (e.g., a developing roller) onto which a developing agent including an electrically charged toner is adhered. During operation of the image forming device, as the developing roller rotates relative to the photosensitive drum (which rotates in the same or opposite rotational direction of the developing roller), the toner in the developing agent on the developing roller is conveyed to the photosensitive layer of the photosensitive drum on which the electrostatic latent image has been formed, which develops the electrostatic latent image on the surface of the photosensitive drum to form a visible toner image on the photosensitive drum.

The developer device can also include a toner regulator, such as in the form of a regulating blade (also referred to as a "doctor blade"), that can regulate a thickness of a toner adhered to the outer surface of the developing roller. In other examples, the toner regulator can have a different form, such as a roller and so forth. A "nip" refers to a space between the toner regulator and the developing roller through which a layer of toner can pass.

During operation of the developer device, contamination can build up on the toner regulator, such as one a surface or multiple surfaces of the toner regulator. For example, if the toner regulator is in the form of a regulating blade, then contamination can build up on a first surface of the regulating blade facing the developing roller, as well as on a second surface (opposite the first surface) of the regulating blade facing away from the developing roller.

The contamination can be caused by toner agglomeration in which toner material can build up and stick to the toner regulator, for example. The contamination on surfaces of the toner regulator can interfere with the nip between the toner regulator and the developing roller, and can cause various image quality issues in images formed on a print medium. Examples of such image quality issues include any or some combination of the following: streaking in the images formed on a print medium, blurring in the images formed on a print medium, and so forth.

In some examples, a developer device may be part of a removable cartridge that can be removably installed in an image forming device. If a user observes an image quality issue (such as that caused by contamination on the toner regulator), the user may replace the cartridge with a new cartridge. However, the replaced cartridge with the image quality issue may still have toner that can be used for image forming operations. If the replaced cartridge is discarded, then the toner remaining in the replaced cartridge is wasted, which can increase costs experienced by users that replace cartridges prematurely.

In accordance with some implementations of the present disclosure, cleaning mechanisms or techniques are provided to remove a contaminant built up on a toner regulator. In some examples, a cleaning mechanism includes an elongated cord. In response to an applied tension, the elongated cord is pulled through a nip between the toner regulator and the developing roller. In some examples, passing the elongated cord through the nip can cause removal of a portion of the contaminant on the toner regulator (as well as a portion of any contaminant on the developing roller). In other examples, passing the elongated cord through the nip can be performed for other purposes.

FIG. 1 is a block diagram of an image forming device 100 that includes a developer device 102 that is to provide a developing agent including a toner to a photoreceptor, which can be in the form of a photoconductive drum 104 in some examples. The photoconductive drum 104 is rotatable during an operation of the image forming device 100 with respect to a rotational axis 105. In some examples, the photoconductive drum 104 is rotatable in a rotational direction 108. The photoconductive drum 104 may include a cylindrical metal pipe and a photoconductive layer formed on an outer surface of the cylindrical metal pipe.

A charging element, which can be in the form of a charging roller 110, can be used to charge a surface of the photoconductive drum 104 to have a uniform surface electric potential. The charging roller 110 is in contact with the photoconductive drum 104. The charging roller 110 is rotated (such as in a rotational direction 112) with respect to the photoconductive drum 104. A charging bias voltage is applied to the charging roller 110 to cause charging of the surface of the photoconductive drum 104. In other examples, instead of the charging roller 110, a corona charger can be used to charge the surface of the photoconductive drum 104.

The image forming device 100 includes an optical scanner 116 that is to form an electrostatic latent image on the surface of the photoconductive drum 104 by irradiating light corresponding to an image to be formed on the print medium 115 onto the surface of the photoconductive drum 104. The light can include a laser, for example. The irradiation of the surface of the photoconductive drum 104, which is charged, forms the electrostatic latent image on the photoconductive drum 104.

The developer device 102 includes a developer housing 120 that defines an inner space 122 in which a developing roller 124 is contained. The housing 120 includes an opening 125 through which the developing roller 124 faces the photoconductive drum 104. The developing roller 124 is rotatable about a rotational axis 126 in a rotational direction 127, for example. The developing roller 124 is in contact with the photoconductive drum 104.

The developing roller 124 when rotated attaches the developing agent in the inner space 122 of the developer device 102 to the surface of the developing roller 124. For example, the developing roller 124 may attach the developing agent to the outer surface of the developing roller 124 by a magnetic force.

In some examples, the developing roller 124 may include a developing sleeve and a magnet within the developing sleeve. The magnet is used to adhere the developing agent to the outer surface of the developing sleeve of the developing roller 124.

During operation of the image forming device 100, the toner of the developing agent on the developing roller 124 is transferred to the charged surface of the photoconductive drum 104, to develop a toner image on the photoconductive drum 104. The toner image developed on the photoconductive drum 104 corresponds to the electrostatic latent image formed on the photoconductive drum based on irradiated light from the optical scanner 116.

A cleaning blade 114 can be used to remove toner remaining on the surface of the photoconductive drum 104 after a transfer operation to transfer a toner image on the photoconductive drum 104 to a print medium 115. The removed toner can be provided to a waste toner container (not shown) of the image forming device 100.

The cleaning blade 114 is located downstream (in the rotational direction 108 of the photoconductive drum 104) of the contact point between the developing roller 124 and the photoconductive drum 104. Note that the charging roller 110 is located upstream (in the rotational direction 108 of the photoconductive drum 104) of the contact point between the developing roller 124 and the photoconductive drum 104.

The image forming device 100 includes a transfer roller 118 that is rotatable with respect to the photoconductive drum 104 along a rotational direction 119, for example.

Although FIG. 1 shows various example rotational directions of rollers of the image forming device 100, in other examples, the rollers can have different rotational directions.

The transfer roller 118 faces the photoconductive drum 104 to form a transfer nip, and the print medium 115 is provided through the transfer nip. A transfer bias voltage can be applied to the transfer roller 118. The toner image developed on the surface of the photoconductive drum 104 is transferred to the print medium 115 by an electric field formed by the transfer bias voltage. The toner image transferred to the print medium 115 is attached to the print medium 115 by an electrostatic force.

The developer device 102 further includes a toner regulator to regulate the thickness of the developing agent on the outer surface of the developing roller 124. In some examples, the toner regulator is in the form of a regulating blade 128 (also referred to as a doctor blade). In other examples, the toner regulator can be in a different form, such as a regulating roller and so forth.

The regulating blade 128 is in contact with the developing roller 124. A regulating nip 130 (shown in FIGS. 2A-2E) is provided between the regulating blade 128 and the developing roller 124.

In accordance with some implementations of the present disclosure, an elongated cord 140 can be used to remove a contaminant in the regulating nip 130 between the regulating blade 128 and the developing roller 124. As an example, the contaminant may be caused by agglomeration of toner material on surfaces of the regulating blade 128.

The image forming device 100 also includes a developer supply 132 to supply the developing agent to the developer device 102. A supply roller 134 (or multiple supply rollers) when rotated can cause the developing agent to be transferred from the developer supply 132 to the inner space 122 of the developer device 102. In other examples, different mechanisms can be employed to transfer the developing agent from the developer supply 132 to the developer device 102.

In some examples, the developer device 102 may be removably mounted in the image forming device 100. For example, a depleted developer device 102 may be removed from the image forming device 100 and replaced with a new developer device.

In some examples, the developer device 102 can be part of a removably mounted print cartridge in the image forming device 100. A cartridge can include a volume containing a developing agent, and the developing agent in the volume can be transferred to the developing roller 124. Generally, a "cartridge" can refer to any container of a developing agent.

The removably mounted print cartridge can include further components in addition to the developer device 102, such as the photoconductive drum 104 and so forth.

FIGS. 2A-2E show an example of how the elongated cord 140 can be used to clean the regulating nip 130 between the regulating blade 128 and the developing roller 124. The elongated cord 140 can be formed using any of various types of materials, including, as examples, a Teflon™-based material, a cloth material, an elastomer, a fibrous material (e.g., cotton thread), a pliable metal, or any other type of material.

Although FIGS. 2A, 2B, 2C, and 2D show a visible gap corresponding to the regulating nip 130 between the regulating blade 128 and the developing roller 124, it is noted that in some examples, the regulating blade 128 is contacted to the developing roller 124. The visible gap is depicted for ease of discussion.

In some examples, the elongated cord 140 has an enlarged mass 142 at a first end (or at another portion) of the elongated cord 140. The enlarged mass 142 has a dimension (e.g., a diameter, a width, etc.) that is larger than a dimension (e.g., a diameter, a width, etc.) of the elongated cord 140. The enlarged mass 142 can be integrally formed with the elongated cord 140, for example. The enlarged mass 142 can be formed of the same material as the elongated cord 140. As an example, the enlarged mass 142 can be formed by tying a knot at the end of the elongated cord 140. In other examples, the enlarged mass 142 and the elongated cord 140 can be formed using an additive manufacturing machine, using an injection molding process, and so forth.

In other examples, the enlarged mass 142 can be omitted from the elongated cord 140.

The first end (or another portion) of the elongated cord 140 is removably attached to a mounting point of a mounting structure 202. When the elongated cord 140 is attached to the mounting point, the elongated cord 140 is positioned away from the regulating nip 130, to avoid interfering with the operation of the developing roller 124 and the regulating blade 128 during an image forming operation of the image forming device 100.

In further examples as discussed further below, a cord holder can also be provided to hold the elongated cord 140 away from the regulating nip 130 until the elongated cord 140 is pulled away for a cleaning operation.

When it is determined that cleaning of the regulating nip 130 is desired to remove a contaminant on the regulating blade 128, a tension in the direction of an arrow 206 can be applied on the elongated cord 140 to cause the elongated cord 140 to detach from the mounting structure 202, and to allow the elongated cord 140 to enter into the regulating nip 130.

As an example, a grip structure 204 (such as a pull tab or another type of structure) can be formed on a second end (or another portion) of the elongated cord 140. The second end of the elongated cord 140 can be opposite the first end of the elongated cord 140. The tension in the direction of the arrow 206 can be applied by a user gripping the grip structure 204, or by an automated force applicator (discussed further below) of the image forming device 100.

The grip structure 204 is an end portion of the elongated cord 140 that is exposed to an outside of the developer device 102, so that the grip structure 204 is accessible for application of a tension on the grip structure 204 by a user or an automated force applicator.

In some examples, the tension can be applied on the grip structure 204 of the elongated cord 140 while the developer device 102 remains the image forming device 100. In other examples, the tension can be applied on the grip structure 204 of the elongated cord 140 after removing the developer device 102 (such as in examples where the developer device 102 is part of a removable cartridge) from the image forming device 100.

In response to the applied tension that exceeds a detach force threshold that is sufficient to pull the first end of the elongated cord 140 away from the mounting structure 202 (and away from a cord holder if present), the elongated cord 140 enters into the regulating nip 130 at an entry point 212. In some examples, the developing roller 124 is formed of a pliable material (such as an elastomeric coating, natural rubber, ethylene propylene rubber, ethylene propylene diene rubber, nitrile rubber, styrene-butadiene block copolymer, polyisoprene, polybutadiene, silicone elastomer, fluoroelastomer, polyurethane elastomer, etc.), so that the elongated cord 140 can be accommodated in the regulating nip 130 and pulled through the regulating nip 130.

Figure 2A:
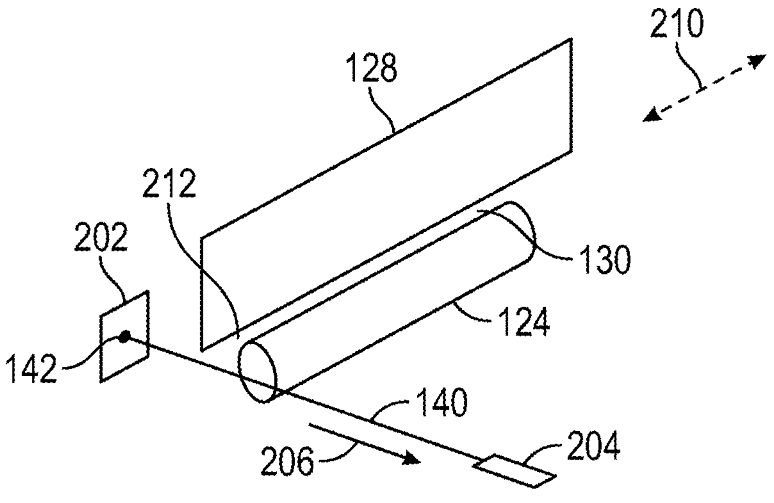
FIGS. 2A-2E show an example of using an elongated cord to that can pass through a nip between a developing roller and a regulating blade, according to some examples.
Figure 2B:
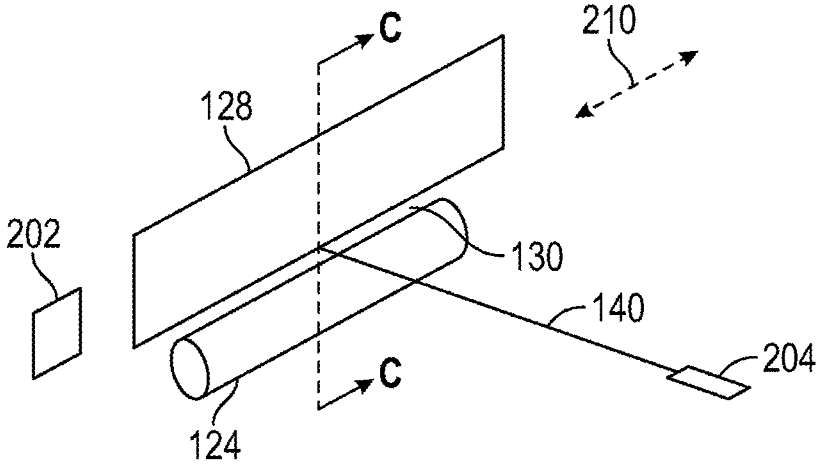

FIG. 2B shows a position of the elongated cord 140 that has entered into the regulating nip 130 at the entry point 212, and that has been pulled to generally near a central portion of the regulating nip 130. The regulating nip 130 has a length along a length axis 210. The length of the regulating nip 130 is generally parallel to a length axis of the developing roller 124 and a length axis of the regulating blade 128. Two lengths are "generally" parallel to one another if they are within ±1° of one another, or within ±2° of one another, or within ±5° of one another, or within ±10° of one another, or within ±15° of one another, or within ±20° of one another, etc.

The tension applied on the grip structure 204 pulls the elongated cord 140 along the length axis 210 of the regulating nip 130. Any contaminant in the regulating nip 130 would be removed by the passage of the elongated cord 140 along the regulating nip 130.

Figure 2C:
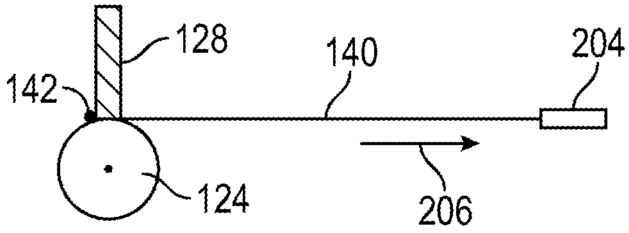

A cross-sectional view of the developing roller 124, the regulating blade 128, and the elongated cord 140 along section C-C is depicted in FIG. 2C. In examples where the enlarged mass 142 is present, the enlarged mass 142 at the first end of the elongated cord 140 prevents the elongated cord 140 from exiting the regulating nip 130 during the cleaning operation in which the elongated cord 140 is pulled along the length of the regulating nip 130.

As shown in FIG. 2B, the application of the tension along the direction of the arrow 206 causes the enlarged mass 142 to engage the regulating blade 128 and the developing roller 124 such that the elongated cord 140 does not exit the regulating nip 130.

In other examples, the enlarged mass 142 can be omitted.

Figure 2D:
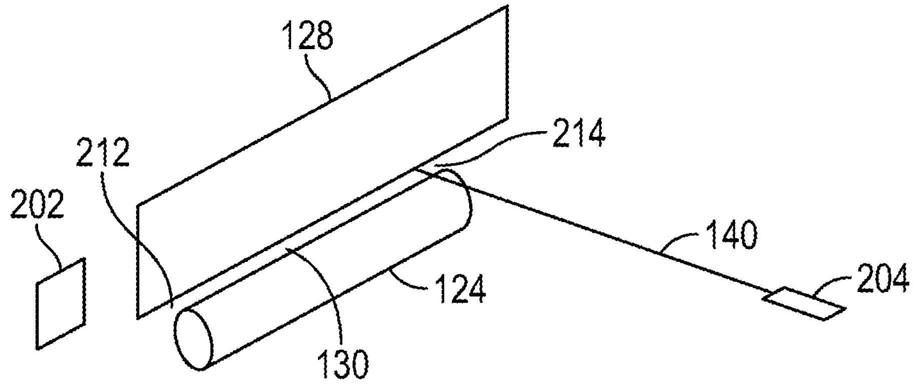

FIG. 2D shows a position of the elongated cord 140 after the elongated has been pulled through the regulating nip 130 to an end portion of the regulating nip 130. In some examples, once the elongated cord 140 has reached the end portion of the regulating nip 130, a further pull of the elongated cord 140 can cause the elongated cord 140 to exit the regulating nip 130 at an exit point 214.

In other examples, a user or an automated force applicator can apply an increased tension that exceeds a removal force threshold to the elongated cord 140 (along direction 206) to pull the elongated cord 140 away from the regulating nip 130. If the elongated mass 142, the increased tension that exceeds the removal force threshold provides a sufficient force to pull the elongated mass 142 through the regulating nip 130.

Figure 2E:
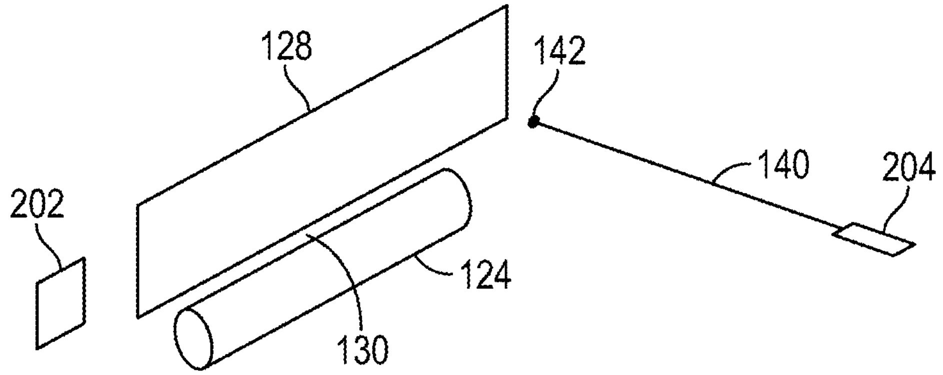

FIG. 2E shows the elongated cord 140 that has exited the regulating nip 130.

In other examples, instead of removing the elongated cord 140 from the regulating nip 130 after the elongated cord 140 has traversed the regulating nip 130 to the end portion of the regulating nip 130, the cleaning operation can continue by pulling the elongated cord 140 back from the exit point 214 to the entry point 212 of the regulating nip 130. The elongated cord 140 can be pulled back and forth along the regulating nip 130 multiple times in some examples.

Figure 3A:
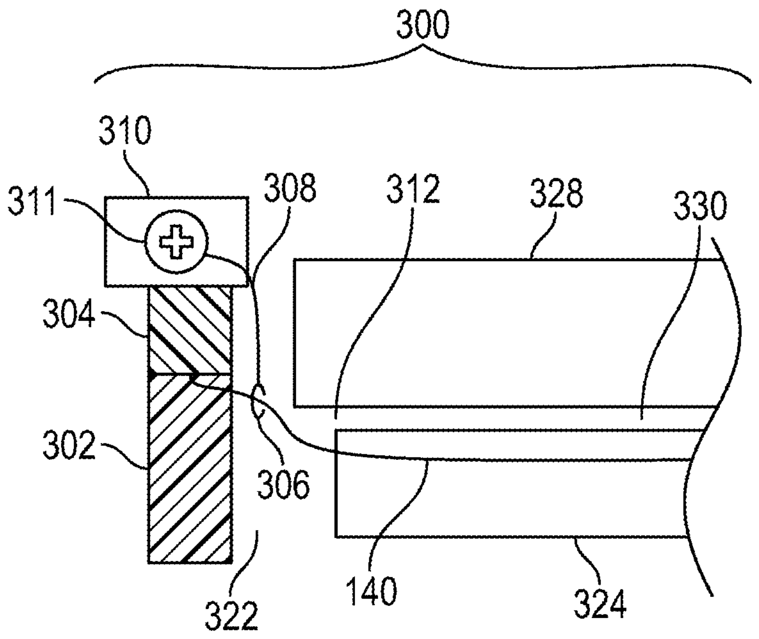
FIGS. 3A-3B show an example of using an elongated cord that can pass through a nip between a developing roller and a regulating blade, according to further examples.

FIG. 3A is a front sectional view of a portion of a developer device 300 that includes a developing roller 324 and a regulating blade 328 that are similar to the developing roller 124 and the regulating blade 128, respectively, of FIGS. 2A-2E. A regulating nip 330 is provided between the developing roller 124 and the regulating blade 128.

FIG. 3A shows an example mounting structure that includes seals 302 and 304. The seals 302 and 304 are part of the developer device 102, and are arranged to keep a developing agent inside an inner space 322 of the developer device 300. The seals 302 and 304 can be engaged with a housing and/or other parts of the developer device 300. The developing agent includes powders that are prevented from exiting the inner space 322 by the seals 302 and 304. The seals 302 and 304 can be formed of any of the following sealing materials: silicone (e.g., room-temperature-vulcanizing silicone), open celled foam polyurethane, an elastomer, or any of the materials listed above for the developing roller 124.

In some examples, the first end (or another portion) of the elongated cord 140 can be embedded between the seals 302 and 304 when the developer device 300 is manufactured. The first end (or another portion) of the elongated cord 140 is fixed between the seals 302 and 304 by the force applied between the seals 302 and 304. When a tension that exceeds the detach force threshold is applied on the elongated cord 140, the elongated cord 140 is removed from the seals 302 and 304.

Although FIG. 3A shows two seals 302 and 304, in other examples, there can be one seal that is engaged to another component, such as a housing of the developer device 300, and the end of the elongated cord 140 is removably fixed between the seal and the other component.

In some examples, a cord holder is also provided in the developer device 300. The cord holder includes a clip 306 (e.g., a C-shaped clip) through which the elongated cord 140 passes, and a clip holder 308 attached to the clip 306. An end of the clip holder 308 is affixed to a mounting plate 310 by a fastener 311, such as a screw or another type of fastener. The clip 306 and the clip holder 308 can be formed of a rigid or semi-rigid material such as plastic, a metal, and so forth. The cord holder keeps the elongated cord 140 out of the regulating nip 330 during an image forming operation of an image forming device, to prevent the elongated cord 140 from interfering with the operation of the developing roller 324 and the regulating blade 328.

In other examples, the cord holder can be omitted.

When a cleaning operation is started, a pull tension applied on the elongated cord 140 removes the first end (or another portion) of the elongated cord 140 from the seals 302 and 304. The elongated cord 140 can be removed from the clip 306 through a gap of the clip 306 and can enter into the regulating nip 330 through an entry point 312.

Figure 3B:
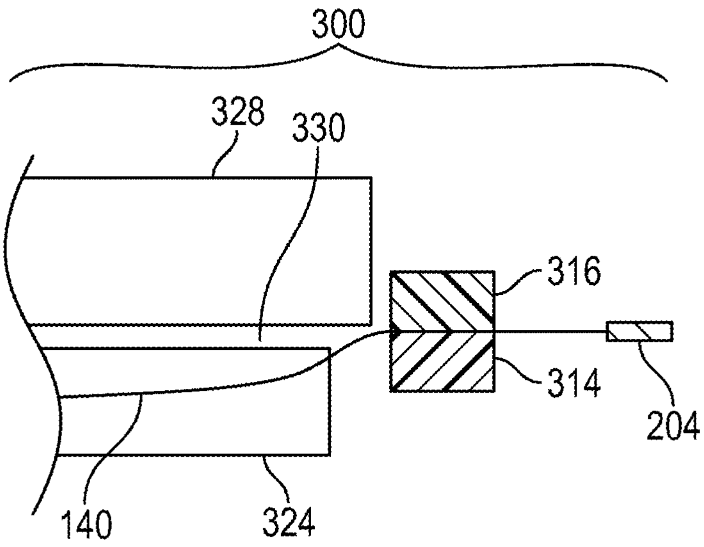

FIG. 3A shows a first side of the developer device 300. FIG. 3B shows an opposite second side of the developer device 300. At the second side, the elongated cord 140 passes through seals 314 and 316, which can be formed of the same or different materials as the seals 302 and 304. The seals 314 and 316 can be engaged with a housing and/or other parts of the developer device 300, to keep the developing agent inside the inner space 322 of the developer device 300.

When a tension is applied (by a user or an automated force applicator) on the gripping structure 204 of the elongated cord 140, the elongated cord 140 can slide between the seals 314 and 316 to pull the elongated cord 140 along the length of the regulating nip 330.

In further examples, the seals 314 and 316 can be substituted with flaps that allow pulling of the elongated cord 140 along the regulating nip 330 while keeping the developing agent inside the developer device 300.

More generally, a retainer (which can be in the form of the seals 314, 316, or flappers, or any other retaining structure) allows the elongated cord 140 to pass through the retainer as the gripping structure 204 is pulled to pull the elongated cord 140 through the regulating nip 330, while the retainer holds the developing agent inside the inner space 322 of the developer device 300.

Figure 4:
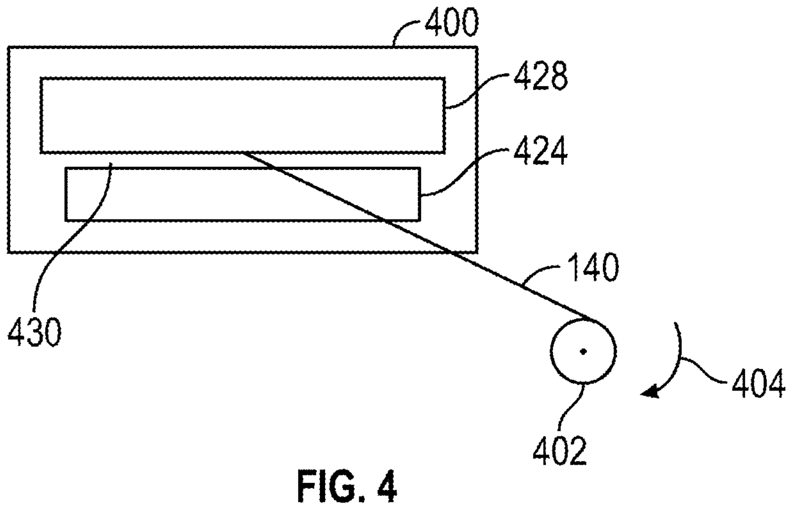
FIGS. 4 and 5 are schematic diagrams of developer devices and rollers attached to elongated cords according to some examples.

FIG. 4 is a schematic view of a portion of a developer device 400 and an automated force applicator in the form of a driven roller 402 in some examples. The driven roller 402 is part of an image forming device, and can be driven by a motor or another type of actuator.

The developer device 400 includes a developing roller 424 and a regulating blade 428 that are similar to the developing roller 124 and the regulating blade 128, respectively, of FIGS. 2A-2E. A regulating nip 430 is provided between the developing roller 124 and the regulating blade 128.

An end of the elongated cord 140 is attached to the driven roller 402. When the driven roller 402 is actuated to rotate, such as in a rotational direction 404, the driven roller 402 applies a tension on the elongated cord 140. The applied tension detaches the elongated cord 140 from a mounting point (e.g., 202 in FIG. 2A or 302, 304 in FIG. 3A) and pulls the elongated cord 140 through the regulating nip 430 of the developing device 400.

In other examples, other types of automated force applicators can be used, such as a slider that can be actuated to move along an axis, and so forth.

If an automated force applicator such as the driven roller 402 is used, a controller in an image forming device can track an amount of toner of the developer device 102 that has been used, such as by counting the quantity of pages printed or measuring, using a sensor, an amount of toner remaining in the developer device 102. The controller can detect an amount of use condition of the developer device 102 (e.g., a page count has exceeded a threshold, the amount of toner used has exceeded a threshold, etc.) that indicates that toner contamination may have built up. In response to detecting the amount of use condition of the developer device 102 that indicates toner contamination buildup, the controller can activate the automated force applicator to pull the elongated cord 140 through the regulating nip 430.

In other examples, the controller can detect image quality issues of images printed onto print media, such as by using an optical sensor. In response to detecting the image quality issues, the controller can activate the automated force applicator to pull the elongated cord 140 through the regulating nip 430.

In examples where pulling of the elongated cord 140 is manually performed by a user, the controller can issue an alert to the user when contamination removal is desired, such as in response to any of the foregoing conditions.

Figure 5:
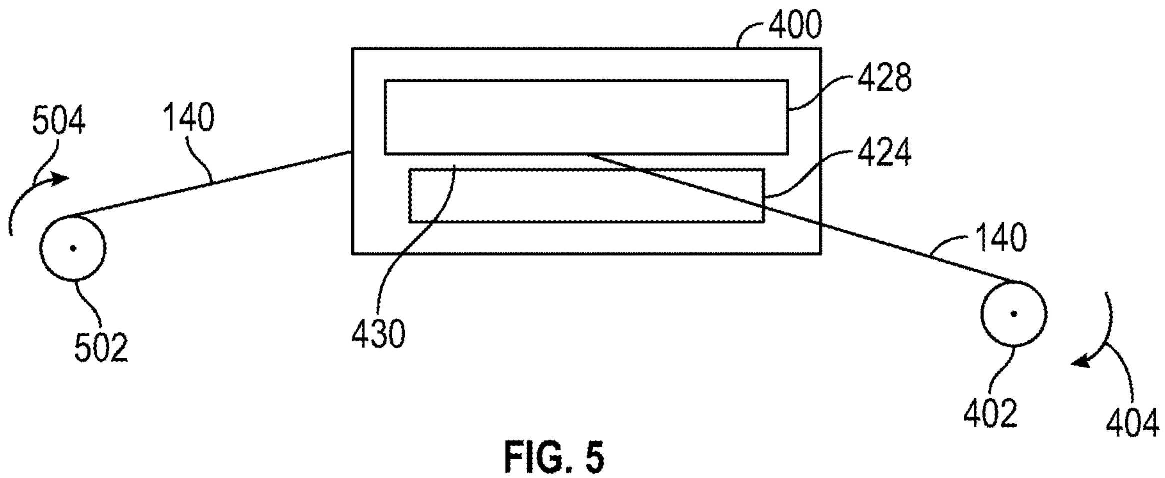

FIG. 5 is a schematic view of another example that uses the developer device 400 and the automated force applicator in the form of the driven roller 402 in some examples.

In addition to the driven roller 402, an image forming device according to FIG. 5 further includes another roller 502. A first end of the elongated cord 140 is attached to the driven roller 402, while an opposite second end of the elongated cord 140 is attached to the roller 502. The elongated cord 140 is initially wound on the roller 502.

When the driven roller 402 is rotated (such as in the rotational direction 404), the elongated cord 140 is pulled by the driven roller 402, and unwinds from the roller 502, which rotates in a rotational direction 504. Once the elongated cord 140 is pulled through the regulating nip 430, further rotation of the driven roller 402 can cause detachment of the elongated cord 140 from the roller 502.

In other examples, the elongated cord 140 does not detach from the roller 502. In such examples, the roller 502 can be driven, such as by a motor or another actuator, to rotate in a reverse rotational direction (the reverse of the rotational direction 504) to cause the elongated cord 140 to unwind from the roller 402 and pass through the regulating nip 430 in the opposite direction.

Figure 6:
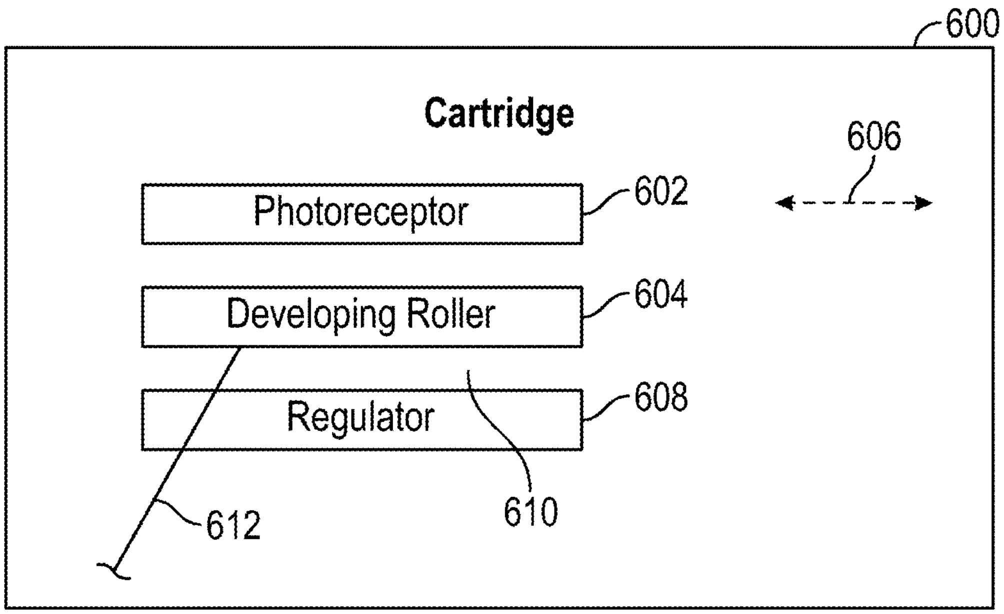
FIG. 6 is a block diagram of a cartridge according to some examples.

FIG. 6 is a block diagram of a cartridge 600 for an image forming device, according to some examples. The cartridge 600 includes a photoreceptor 602 and a developing roller 604 to transfer a toner to an electrostatic latent image on the photoreceptor 602. The photoreceptor 602 has a length along a length axis 606.

The cartridge 600 includes a regulator 608 that has a length that is generally parallel to the length of the photoreceptor 602.

The cartridge 600 includes a nip 610 between the regulator 608 and the developing roller 604. A developing agent including a toner is to pass through the nip 610. The nip 610 has a length that extends in a direction that is generally parallel to the length of the photoreceptor 602 and the length of the developing roller 604.

The cartridge 600 includes an elongated cord 612 to traverse the length of the nip 610 in response to an applied tension. In some examples, the elongated cord 612 traversing the length of the nip 610 is to cause removal of a contaminant on the regulator 608.

Figure 7:
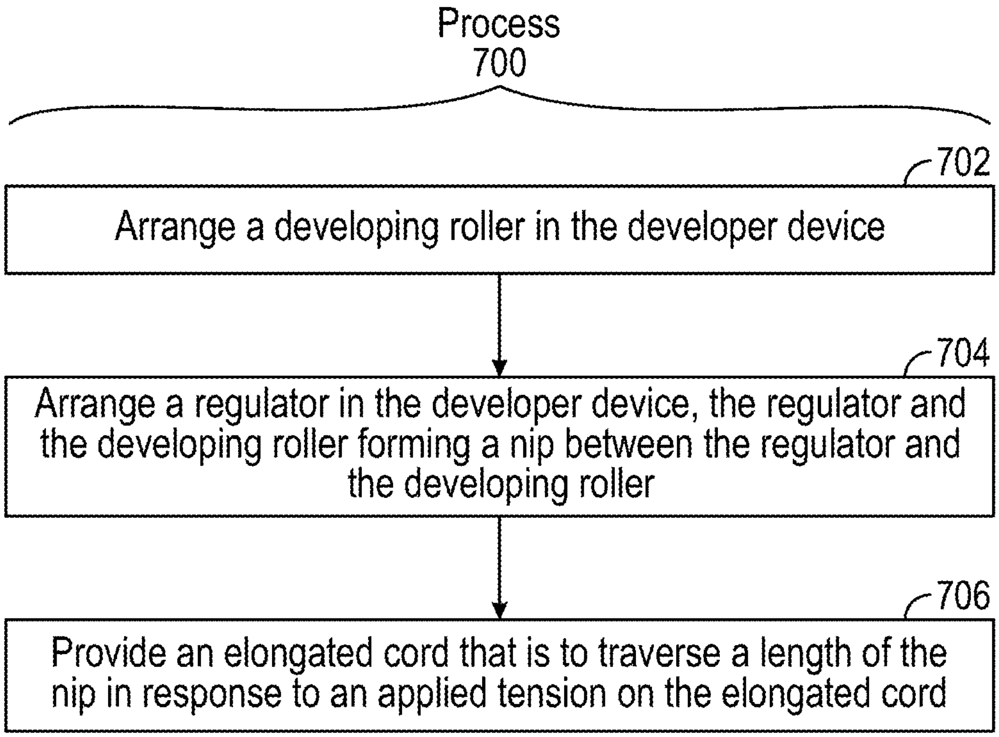
FIG. 7 is a flow diagram of a process of forming a developer device according to some examples.

FIG. 7 is a flow diagram of a process 700 of forming a developer device, according to some examples.

The process 700 includes arranging (at 702) a developing roller in the developer device.

The process 700 includes arranging (at 704) a regulator in the developer device, the regulator and the developing roller forming a nip between the regulator and the developing roller. In some examples, the regulator is in the form of a regulating blade.

The process 700 includes providing (at 706) an elongated cord that is to traverse a length of the nip in response to an applied tension on the elongated cord. The applied tension can be from a user or an automated force applicator.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A developer device for an image forming device, comprising:
- a developing roller;
- a regulator;
- a nip between the regulator and the developing roller, wherein a developing agent is to pass through the nip; and
- an elongated cord to traverse a length of the nip and exit the nip in response to an applied tension.

2. The developer device of claim 1, wherein the length of the nip is generally parallel to a length of the regulator.

3. The developer device of claim 1, wherein an end portion of the elongated cord is exposed to an outside of the developer device, the end portion accessible to pull the elongated cord to apply the tension.

4. The developer device of claim 3, wherein the end portion is for attachment to a force applicator of the image forming device, the force applicator to pull the elongated cord.

5. The developer device of claim 3, further comprising:
- a retainer through which the elongated cord passes as the end portion of the elongated cord is pulled through the nip, wherein the retainer allows passage of the elongated cord through the retainer while the retainer holds a developing agent inside an inner space of the developer device.

6. The developer device of claim 1, wherein the elongated cord is removably attached to a mounting point, and the elongated cord is detachable from the mounting point in response to the applied tension.

7. The developer device of claim 6, wherein the mounting point is in the developer device.

8. The developer device of claim 6, further comprising:
- a seal to prevent leakage of the developing agent in the developer device, wherein the mounting point is between the seal and another component of the developer device.

9. The developer device of claim 6, further comprising:
- a cord holder to position a portion of the elongated cord away from the nip while the elongated cord is attached to the mounting point.

10. The developer device of claim 1, wherein the elongated cord has an enlarged mass at an end of the elongated cord, and wherein the enlarged mass is passable through the nip to release the elongated cord from the developer device responsive to the tension exceeding a force threshold.

11. A cartridge for an image forming device, comprising:
- a photoreceptor;
- a developing roller to transfer a toner to an electrostatic latent image on the photoreceptor that has a length;
- a regulator that has a length that is generally parallel to the length of the photoreceptor;
- a nip between the regulator and the developing roller, wherein a developing agent comprising the toner is to pass through the nip, and the nip has a length that extends in a direction that is generally parallel to the length of the photoreceptor and a length of the developing roller; and
- an elongated cord to traverse the length of the nip and exit the nip in response to an applied tension.

12. The cartridge of claim 11, wherein the elongated cord traversing the length of the nip is to cause removal of a contaminant on the regulator.

13. The cartridge of claim 11, further comprising:
- a retainer through which the elongated cord passes as the elongated cord is pulled through the nip, wherein the retainer allows passage of the elongated cord through the retainer while the retainer holds the developing agent inside an inner space of the cartridge.

14. A method of forming a developer device, comprising:
arranging a developing roller in the developer device;
arranging a regulator in the developer device, the regulator and the developing roller forming a nip between the regulator and the developing roller; and
providing an elongated cord that is to traverse a length of the nip and exit the nip in response to an applied tension on the elongated cord.

15. The method of claim 14, wherein the elongated cord initially wound on a roller is unwound from the roller in response to the applied tension as applied by a force applicator.

* * * * *